Patented July 9, 1940

2,207,555

UNITED STATES PATENT OFFICE 2,207,555

PRECIPITATION OF STARCH UPON FIBERS USED IN THE MANUFACTURE OF PAPER

Ben W. Rowland, Appleton, Wis., assignor, by mesne assignments, to Stein, Hall Manufacturing Company, Chicago, Ill., a corporation of Delaware No Drawing. Application May 17, 1934, Serial No. 726,125

14 Claims. (Cl. 92—21)

The invention relates to the precipitation of starch upon fibers used in the manufacture of paper. It is of particular value in connection with the use of starch in the furnish.

The word "starch" as used herein, is intended to include not only the various kinds of starch proper, such as corn starch, potato starch, tapioca starch, etc., or flours containing said starches.

The advantage due to the use of starch in the manufacture of paper has long been recognized. Starch in various ways has been employed in the coating or finishing of the paper web after the formation of the latter on the wire. Various proposals have also been put forward for incorporating starch in the furnish, before formation of the web, but it has been found that where a considerable quantity of starch is supplied to the furnish, only a relatively small amount of such starch is found in the formed web. This apparently is due to the fact that starch being a dispersible colloid, is not precipitated upon or retained by the fibers in any large amount, and therefore to a large extent is retained by, and is carried off with, the white water which drains out of the web. As a result, prior to this invention, it has not been possible to incorporate starch with the web in an amount exceeding a few percent of the weight of fiber on the dry basis. Also, in order to secure the retention of such relatively small percentage of starch, it has been necessary to use in the furnish a much greater percentage, thereby causing such waste and expense that practically speaking, the use of starch heretofore in the furnish has been attended with no substantial commercial advantage.

Although practical paper makers may have made attempts to fix or precipitate the starch content of a paper furnish upon the fibers of the furnish so as to prevent the starch from disappearing with the white water, such attempts, so far as I am advised, have met with no practical success.

As a basis for my practical solution of this heretofore unsolved problem, I utilize the theory that certain colloids in aqueous suspension carry an electro-kinetic charge of definite polarity and that such colloids may be coagulated or agglomerated, and thereby precipitated, by incorporating in the liquid dispersion a proper amount of a material which possesses an electro-kinetic charge of opposite polarity.

Starch in the form of a sol, prepared for example by cooking ordinary starch, consists of sub-microscopic particles bearing a negative charge. The cooked starch is colloidal or gelatinous in form. Hence, in pursuing such scientific theory, the further problem presented to me was to determine upon a suitable material preferably of a colloidal character the sub-microscopic particles of which carried a positive electro-kinetic charge. The material which I have found to best answer these requirements appears to be colloidal alumina.

Inasmuch as cellulose fibers when suspended in an aqueous medium under ordinary conditions are considered as bearing a negative charge, a preferred practice of my invention contemplates the addition of a slight excess of electro-positive material over the quantity required for electrical neutralization of all the starch present. It is believed that in this way the precipitated complex of starch and electro-positive material is thus associated with said excess of electro-positive material with its corresponding excess of positive electricity, the final effect being to confer a residual positive charge on the precipitated mass, thus favoring adhesion to the negative cellulose. Another theory is that the excess of alumina or other electro-positive material beyond that required for neutralizing the starch may migrate to the negative cellulose surface, becoming adsorbed there and, in effect, establishing a positive cellulose surface toward which starch or a slightly negative starch-alumina complex may migrate and to which they may become attached. It will be understood by those skilled in the art that the cellulose fibers worked in the aqueous medium become hydrated or gelatinized. It will also be understood by those skilled in the art that the term "alumina" employed throughout the specification includes aluminum oxide and hydrated oxide (aluminum hydrate).

It will be understood, however, that my invention is not restricted to any theory of operation, the theories being advanced merely in an endeavor to explain the results of a preferred mode of operation.

In order to effect the proper precipitation of the starch upon the fibers, the suspension of colloidal alumina is formed in the furnish after the stock has been subjected to the necessary beating action and has passed through the usual Jordan engine. This assures that the delicate gelatinous precipitate is not removed from the fibers by mechanical abrasion.

Also, the starch should remain in dispersion until it has been thoroughly incorporated with the furnish, otherwise it will not be uniformly precipitated throughout the mass of fibers. Therefore the agent, the addition of which produces the colloidal alumina, is preferably the last to be added to the furnish. In practice, the alumina may be formed from alum which is neutralized by the addition of any suitable alkali. I prefer to use sodium hydroxide, although such materials as sodium silicate, sodium aluminate, or sodium phosphate may be employed.

In practice, for the reason stated above, although the starch and alkali may be added to the furnish in different sequences, the final addition must be that of alum or of alkali. In certain cases it may be found desirable to add the alkali to the starch before the starch is added to the furnish, but in that case, the alum should be added last after the other materials have been thoroughly incorporated with the batch. At any rate, it is desirable that the starch and the alumina (or other colloidal gels) be co-precipitated, i. e., brought down together, so that the starch will become attached to the fiber.

Example

The furnish may consist of soda pulp or sulphite pulp, or rag stock, or a combination of the same, and may include also a substantial percentage of ground wood if a relatively cheap paper is being produced. A suitable percentage of mineral filler may also be included in the furnish. In fact, the invention appears to work well with almost any kind of furnish used in the manufacture of paper.

To this furnish there is added a solution of starch, the weight of the starch on the dry basis being about 4% of the weight of the furnish on the dry basis. This starch may be any ordinary starch such as corn starch, potato starch, tapioca starch or flour, or the like, which has been properly cooked so as to produce a colloidal suspension of sub-microscopic particles, the strength of the solution being one part of starch to twenty parts of water by weight.

This cooked starch solution is added to the furnish and there is also added to the beater charge sufficient ordinary alum to represent 2% of the furnish by weight on the dry basis. This alum may be added in the form of a water solution in any degree of concentration.

To the finished and fully worked stock or furnish but before it is conducted to the head box of the machine, there is added a small amount of alkali in sufficient amount to neutralize the acid in the alum and thus bring down the alumina in the form of a colloidal suspension. At this stage of the process a pH of 7.0 appears to be satisfactory, although if sufficient alkali is added to give a pH of 8 or 9, no bad effects are apparent. Ammonia can be used, but I find it more practical to use sodium hydroxide. It requires about ¼ of one per cent of this material based upon the dry weight of the furnish.

As previously described, the particles of alumina, when formed in the solution by the final step of the reaction, unite with the particles of starch, the agglomerated combined particles of starch and alumina being sufficiently large and of such character that they are precipitated in the form of gelatinous nuclei which stick to the fibers of the furnish.

The furnish is then run through the machine in the ordinary way without any material change in machine practice. If desired, the furnish may be treated with rosin size without interfering with the process. In such case, after the furnish has been treated with the rosin size, the usual additional quantity of alum such as is customarily employed for the setting of the size, is added. In such case, the furnish may be brought into an acid condition but this will not reverse the action of alumina and starch as described above.

Paper made by the use of this process has many advantages over paper which does not contain starch and it also has a great advantage over paper which contains the same amount of starch as may be incorporated in the same grade of paper according to the old practice. For example, if an unstarched sheet has a pop test of 60, a sheet containing starch added according to the old practice might have a pop test of 72, whereas a paper containing the same percentage of starch incorporated according to my invention will have a pop test of perhaps 90. Thus, the efficiency of the starch in increasing the strength of the paper is more than doubled by my process as compared with the old practice. This is also true if the furnish contains a substantial percentage of material other than fiber, for example, clay.

Hence, it will be obvious that to meet the same strength test specifications, paper containing starch incorporated according to my invention, can contain a considerably greater percentage of relatively inexpensive mineral filler. The addition of a mineral filler such as clay, of course has the advantage of increasing the opacity of the paper and it may be stated that any slight decrease in opacity due to the addition of a large percentage of starch may be more than compensated for by slightly increasing the percentage of clay. The net result is that a stronger paper having a greater opacity than prior art paper of similar grade, can be produced at considerably less cost than such prior art paper.

It may be stated that paper made according to my invention from furnish containing as little as 4% of starch on the dry basis is practically free from surface fuzz as compared with similar papers made according to the old practice.

In the use of my process an extraordinarily high percentage of starch may be incorporated in the paper. For example, with my process it is possible to make a 35 pound book paper containing as high as from 10 to 12 per cent of starch.

In some cases it may be found that the feeding and grinding of the furnish, due to working it in the beater and Jordan, may have a deleterious effect upon the starch when the latter is added to the furnish in the beater. In such a case the starch may be added to the stock after it has passed through the Jordan and has been fully worked. This subsequent addition of the starch will naturally involve a mixing operation in order thoroughly to incorporate the starch with the worked furnish before the alum or final ingredient is added for the purpose of effecting the precipitation. It will be understood by those skilled in the art that the term "alum" employed throughout the specification refers to "paper maker's alum" or aluminum sulphate.

The described details of manipulative steps or materials used are merely illustrative of a practical embodiment of my invention, which details may be varied within the scope of the appended claims, said claims being construed as broadly as the state of the art will permit.

I claim as my invention:

1. That improvement in the art of paper making comprising preparing paper pulp and prior to the formation of the sheet incorporating with the pulp aluminum sulphate, an alkaline substance adapted to react with aluminum sulphate by double decomposition to form colloidal alumina and a gelatinized colloidal starch containing particles of sub-microscopic size, the order of addition being such that said aluminum sulphate and said alkaline substance are added at separate stages of the paper making process and that the starch is incorporated with the pulp at a point so as to be present when the second of said other substances is added regardless of which is added first, the addition of said second substance being after the major beating operation and prior to the formation of the sheet whereby the gelatinized colloidal starch is co-precipitated with the alumina and is bonded to the fibers by a mixed precipitate of alumina and gelatinized starch.

2. That improvement in the art of paper making comprising preparing paper pulp and prior to the formation of the sheet incorporating with the pulp aluminum sulphate, an alkali, and a gelatinized colloidal starch containing particles of sub-microscopic size, the order of addition being such that said aluminum sulphate and said alkali are added at separate stages of the paper making process and the starch is incorporated with the pulp at a point so as to be present when the second of said other substances is added regardless of which is added first, the addition of said second substance being after the major beating operation and prior to the formation of the sheet whereby the gelatinized starch is co-precipitated with alumina and is bonded to the fibers by a mixed precipitate of alumina and gelatinized starch.

3. That improvement in the art of paper making which includes preparing paper pulp in a beater, a Jordan and other customary apparatus and prior to the formation of the sheet incorporating with the pulp aluminum sulphate, an alkaline substance adapted to react with aluminum sulphate to form colloidal alumina, and a gelatinized colloidal starch containing particles of sub-microscopic size, the order of addition being such that said aluminum sulphate and said alkaline substance are added at separate stages of the paper making process and the starch is incorporated with the pulp at a point so as to be present when the second of said other substances is added regardless of which is added first, the addition of said second substance being after the stock has been substantially completely worked in the Jordaning operation and : ior to the formation of the sheet whereby the gelatinized starch is coprecipitated with alumina and is bonded to the fibers by a mixed precipitate of alumina and gelatinized starch, the proportions of added materials being such that the final condition of the pulp before formation of the sheet is non-alkaline.

4. That improvement in the art of paper making comprising preparing paper pulp including a beating operation, a Jordaning operation and other customary operations and prior to the formation of the sheet separately incrporating with the pulp aluminum sulphate, an alkali, and a gelatinized colloidal starch containing particles of sub-microscopic size, the order of addition being such that said aluminum sulphate and said alkali are added at separate stages of the paper making process and the starch is incorporated with the pulp at a point so as to be present when the second of said other substances is added regardless of which is added first, the addition of said second substance being after the stock has ben substantially completely worked in the Jordaning operation and prior to the formation of the sheet whereby the gelatinized starch is co-precipitated with alumina and is bonded to the fibers by a mixed precipitate of alumina and gelatinized starch, the proportions of added materials being such that the final condition of the pulp before formation of the sheet is non-alkaline.

5. That improvement in the art of paper making comprising preparing paper pulp and prior to the formation of the sheet incorporating with the pulp aluminum sulphate, an alkali adapted to precipitate colloidal alumina by reaction with aluminum sulphate, and a gelatinized colloidal starch containing particles of sub-microscopic size adapted to be co-precipitated by colloidal alumina, the order of addition being such that said aluminum sulphate and said precipitating substance are added at separate stages of the paper making process and the starch is incorporated with the pulp at a point so as to be present when the second of said other substances is added regardless of which is added first, the addition of both said second substance and said starch being after the major beating operation and prior to the formation of the sheet whereby the gelatinized starch is co-precipitated with alumina and is bonded to the fibers by a mixed precipitate of alumina and gelatinized starch, the proportions of added materials being such that the final condition of the pulp before formation of the sheet is non-alkaline.

6. That improvement in the art of paper making comprising preparing paper pulp and prior to the formation of the sheet incorporating with the pulp aluminum sulphate, an alkali, and a gelatinized starch containing particles of sub-microscopic size, the order of addition being such that said aluminum sulphate is added so as to be present during the major beating operation, that said alkali is added after the major beating operation and prior to the formation of the sheet thereby to produce colloidal alumina and that said starch is added so as to be present when said colloidal alumina is formed whereby the gelatinized starch is co-precipitated with the alumina and is bonded to the fibers by a mixed precipitate of alumina and gelatinized starch.

7. That improvement in the art of paper making comprising preparing paper pulp including the beating operation, a Jordaning operation and other customary operations and prior to the formation of the sheet incorporating with the pulp aluminum sulphate, an alkali, and a gelatinized starch substantially in the form of sub-microscopic particles, the order of addition being such that the aluminum sulphate is added so as to be present during the major beating operation, that the alkali is added after the pulp has been substantially completely worked in the Jordaning operation and prior to the formation of the sheet thereby to form a precipitate of colloidal alumina, and the starch is added after the stock has been substantially completely worked in the Jordaning operation and so as to be present when said precipitate of colloidal alumina is formed whereby the gelatinized starch is co-precipitated with said alumina and is bonded to the fibers by a mixed precipitate of alumina and gelatinized starch.

8. That improvement in the art of paper making comprising preparing paper pulp and prior to the formation of the sheet incorporating with the pulp aluminum sulphate, an alkali, and a gelatinized starch containing particles of sub-microscopic size, the order of addition being such that the aluminum sulphate is added so as to be present during the major beating operation, the alkali is added after the major beating operation and prior to the formation of the sheet thereby to form colloidal alumina by reaction with the aluminum sulphate, the amount of alkali being at least sufficient to neutralize the acid condition of the stock, the starch being incorporated with the pulp at a point so as to be present when said precipitate of colloidal alumina is formed whereby the gelatinized starch is co-precipitated with the alumina and is bonded to the fibers by a mixed precipitate of alumina and gelatinized starch, and after the formation of said precipitate adding a material to bring the pulp back to acid condition.

9. That improvement in the art of paper making comprising preparing paper pulp and prior to the formation of the sheet separately incorporating with the pulp aluminum sulphate, an alkali, and a gelatinized starch obtained by heating a raw starch sufficiently in water until a colloidal suspension is obtained in which substantially all of the particles are of sub-microscopic size and which is capable of being co-precipitated by colloidal alumina, the order of addition of said materials to the pulp being such that the aluminum sulphate and said alkali are added at separate stages of the paper making process and the starch is incorporated with the pulp at a point so as to be present when the second of said other substances is added regardless of which is added first, the addition of said second substance being after the major beating operation and prior to the formation of the sheet whereby the gelatinized starch is co-precipitated with alumina and is bonded to the fibers by a mixed precipitate of alumina and gelatinized starch, the amount of starch employed in said operation being about 4% based on the dry weight of the furnish and the amount of aluminum sulphate being about 2% by weight on a dry basis.

10. That improvement in the art of paper making comprising preparing paper pulp and prior to the formation of the sheet incorporating with the pulp aluminum sulphate, an inorganic alkaline substance capable of reacting with aluminum sulfate to form colloidal alumina and a gelatinized colloidal starch containing particles of submicroscopic size, the order of addition being such that said aluminum sulfate and said precipitating means are added at separate stages of the paper making process and that the starch is incorporated with the pulp at a point so as to be present when the second of said other substances is added regardless of which is added first, the addition of said second substance being after the major beating operation and prior to the formation of the sheet whereby the gelatinized colloidal starch is coprecipitated with the alumina and is bonded to the fibers by a mixed precipitate of alumina and gelatinized starch.

11. That improvement in the art of paper making comprising preparing paper pulp and prior to the formation of the sheet incorporating with the pulp aluminum sulphate, an alkaline substance adapted to precipitate colloidal alumina by reaction with aluminum sulphate, and a gelatinized colloidal starch containing particles of sub-microscopic size adapted to be co-precipitated by colloidal alumina, the order of addition being such that said aluminum sulphate and said alkaline substance are added at separate stages of the paper making process and the starch is incorporated with the pulp at a point so as to be present when the second of said other substances is added regardless of which is added first, the addition of both said second substance and said starch being after the major beating operation and prior to the formation of the sheet whereby the gelatinized starch is co-precipitated with alumina and is bonded to the fibers by a mixed precipitate of alumina and gelatinized starch, the proportions of added materials being such that the final condition of the pulp before formation of the sheet is non-alkaline.

12. That improvement in the art of paper making comprising preparing paper pulp including the beating operation, a Jordaning operation and other customary operations and prior to the formation of the sheet incorporating with the pulp aluminum sulphate, an alkaline substance and a gelatinized starch substantially in the form of sub-microscopic particles, the order of addition being such that the aluminum sulphate is added so as to be present during the major beating operation, that the alkaline substance is added after the pulp has been substantially completely worked in the Jordaning operation and prior to the formation of the sheet thereby to form a precipitate of colloidal alumina, and the starch is added after the stock has been substantially completely worked in the Jordaning operation and so as to be present when said precipitate of colloidal alumina is formed whereby the gelatinized starch is co-precipitated with said alumina and is bonded to the fibers by a mixed precipitate of alumina and gelatinized starch.

13. That improvement in the art of paper making comprising preparing paper pulp and prior to the formation of the sheet incorporating with the pulp aluminum sulphate, an alkaline substance adapted to precipitate colloidal alumina by reaction with the aluminum sulphate, and a gelatinized colloidal starch adapted to be co-precipitated by colloidal alumina, the order of addition being such that said aluminum sulphate and said alkaline substance are added at separate stages of the paper making process and the starch is incorporated with the pulp at a point so as to be present when the second of said other substances is added regardless of which is added first, the addition of both said second substance and said starch being after the major beating operation and prior to the formation of the sheet whereby the gelatinized starch is co-precipitated with alumina and is bonded to the fibers by a mixed precipitate of alumina and gelatinized starch, the amount of starch employed in said operation being about 4% based on the dry weight of the furnish and the amount of aluminum sulphate being about 2% based on the dry weight of the furnish.

14. That improvement in the art of paper making comprising preparing paper pulp by a beating operation, a bonding operation and other customary operations and prior to the formation of the sheet incorporating with the pulp aluminum sulphate, an alkaline substance and a gelatinized starch, the order of addition being such that the aluminum sulphate is added so as to be present during the major beating operation, that the alkaline substance is added after the pulp has been substantially completely worked in the Jordaning operation and prior to the formation of the sheet thereby to form a precipitate of colloidal alumina, and the starch is added after the stock has been completely worked in the Jordaning operation and so as to be present when said precipitate of colloidal alumina is formed whereby the gelatinized starch is co-precipitated with said alumina and is bonded to the fibers by a mixed precipitate of alumina and gelatinized starch, the amount of starch employed in said operation being about 4% based on the dry weight of the furnish and the amount of aluminum sulphate being about 2% based on the dry weight of the furnish.

BEN W. ROWLAND.